United States Patent
Volkert et al.

(10) Patent No.: US 11,096,405 B2
(45) Date of Patent: Aug. 24, 2021

(54) CARROT JUICE CONCENTRATE

(71) Applicant: GNT GROUP B.V., Mierlo (NL)

(72) Inventors: Marcus Volkert, Mierlo (NL); Anke Kiesslich, Mierlo (NL); Hendrik Hoeck, Mierlo (NL)

(73) Assignee: GNT GROUP B.V., Mierlo (NL)

( * ) Notice: Subject to any disclaimer, the term of this patent is extended or adjusted under 35 U.S.C. 154(b) by 0 days.

(21) Appl. No.: 17/045,650

(22) PCT Filed: Apr. 5, 2019

(86) PCT No.: PCT/EP2019/058680
§ 371 (c)(1),
(2) Date: Oct. 6, 2020

(87) PCT Pub. No.: WO2019/193172
PCT Pub. Date: Oct. 10, 2019

(65) Prior Publication Data
US 2021/0084941 A1  Mar. 25, 2021

(30) Foreign Application Priority Data
Apr. 6, 2018 (EP) ..................... 18166043

(51) Int. Cl.
*A23L 2/08* (2006.01)
*A23L 29/30* (2016.01)
*A23L 33/115* (2016.01)
*A23L 33/125* (2016.01)
*A23L 2/60* (2006.01)
*A23L 2/72* (2006.01)

(52) U.S. Cl.
CPC ............... *A23L 2/087* (2013.01); *A23L 2/60* (2013.01); *A23L 2/72* (2013.01); *A23L 29/30* (2016.08); *A23L 33/115* (2016.08); *A23L 33/125* (2016.08)

(58) Field of Classification Search
CPC .......... A23L 2/087; A23L 33/125; A23L 2/60; A23L 2/72
USPC .................. 426/73, 262, 270, 590
See application file for complete search history.

(56) References Cited

U.S. PATENT DOCUMENTS

| 3,787,589 | A | | 1/1974 | Stephens et al. |
| 4,844,934 | A | * | 7/1989 | Lueddecke et al. |
| 5,403,613 | A | | 4/1995 | Furui et al. |
| 6,340,489 | B1 | | 1/2002 | Suzuki et al. |

FOREIGN PATENT DOCUMENTS

| FR | 3020577 | * | 11/2015 |
| WO | 2014033703 | A1 | 3/2014 |

OTHER PUBLICATIONS

Hashim et al. "Quality characteristics and consumer acceptance of yogurt fortified with date fiber", 2009, pp. 1-5, J.Dairy Sci. 92: 5403-5407. (Year: 2009).*

Grauwet, T., Evaluating the potential of high pressure high temperature and thermal processing on volatile compounds, nutritional and structural properties of orange and yellow carrots, Eur Food Res Technol, 2015, pp. 183-198, vol. 240, Springer-Verlay Berlin Heidelberg, Germany.

* cited by examiner

*Primary Examiner* — Helen F Heggestad
(74) *Attorney, Agent, or Firm* — Hudak, Shunk & Farine Co. LPA

(57) ABSTRACT

A carrot concentrate having a. between 0.115 and 0.25 wt. % Carotenoid (relative to the total weight of the carrot concentrate); b. between 7-24 wt. % edible oil (relative to the total weight of the carrot concentrate); c. between 20 and 75 wt. % (DM) of sugars (relative to the dry matter of the carrot concentrate); wherein the dry matter content of the carrot concentrate ranges between 40 and 75 wt. % relative to the total of the concentrate, wherein the wt. % (DM) means the wt. % of the component relative to the dry matter content, wherein the ratio of edible oil to carotenoids ranges between 40 and 210, and wherein the carrot concentrate has a color diluted in yoghurt, at dosage equivalent to a carotenoid concentration of 0.3795 mg/100 g, wherein the color is defined in the CIELAB color space, and wherein the color is described by a L*-value ranging between 93 and 98, an a*-value ranging between −2.5 and +1.0, and a b*-value ranging between 21.5 and 30. A process for making the carrot concentrate and food products containing the carrot concentrate.

22 Claims, No Drawings

CARROT JUICE CONCENTRATE

FIELD OF THE INVENTION

The invention is directed to a carrot concentrate, a method to prepare the carrot concentrate from orange carrots and the use of the carrot concentrates.

BACKGROUND OF THE INVENTION

Orange carrots (*Daucus carota* L.) are grown worldwide and are popular for their orange color and the healthy ingredients like carotenoids.

The orange color also made the carrots popular as a source for carrot juice. Carrot juice is also used for coloring food and as a healthy ingredient in food with a high level of carotenoids, especially β-carotene (provitamin A).

Several processes for the production of carrot juice are known. These processes are, for example, described in U.S. Pat. Nos. 3,787,589, 5,403,613 and 6,340,489. U.S. Pat. No. 3,787,589 describes that raw carrots are cooked in an acidic aqueous solution prior to juice extraction.

U.S. Pat. No. 5,403,613 describes that carrots are crushed or chopped while the carrots are sprayed with citric acid or lemon juice, optionally in combination with ethyl alcohol and salt water. Thereafter the crushed or chopped carrots are heated and the carrot juice is squeezed out in a twin-screw extruder.

U.S. Pat. No. 6,340,489 describes that the carrots are peeled and blanched in water with a temperature of 70 to 80° C. Thereafter, citric acid is applied to the blanched carrots and the blanched carrots are crushed and squeezed to obtain the carrot juice.

Grauwet Tara et al., Eur Food Res Technol (2015)240: 183-198 (XP035416443) describes the potential of high pressure high temperature and thermal processing on volatile compounds, nutritional and structural properties of orange and yellow carrot purees. Carrots are processed by homogenization at room temperature, followed by a heating step under static conditions. This heating can be performed under increased pressure.

U.S. Pat. No. 4,844,934 describes the preparation of finely divided water dispersable carotenoid formulations. The formulations are prepared by dissolving beta-carotene into water, dextrin and other ingredients. The formulations are not prepared from carrot concentrates.

WO2014/033703 describes hue controlled beta carotene formulations. The formulations are not derived from carrot concentrates, but rather from the pure component beta-carotene.

It is also known to make a color concentrate by ultrafiltration of the carrot juice. The retentate, obtained during ultrafiltration, is used as the color concentrate. The permeate is the composition that has passed through the membrane used for ultrafiltration.

The retentate has an orange color, which is suitable for many food and beverage applications. However, in some applications an intense, opaque yellow color is desired, which is not available from natural feedstocks like orange carrots, or which is not available with an intense bright yellow color at a low price.

SUMMARY OF THE INVENTION

The inventors have found a new process for making a carrot concentrate having an intense yellow color, which is stable and can be used as a natural color to color foodstuff.

The orange carrot retentate is used as raw material for the new yellow concentrated products.

The invention relates to a carrot concentrate comprising
a) between 0.115 and 0.25 wt. % carotenoid (relative to the total weight of the carrot concentrate);
b) between 7-24 wt. % edible oil (relative to the total weight of the carrot concentrate);
c) between 20 and 75 wt. % (DM) of sugars (relative to the dry matter of the carrot concentrate);
wherein the dry matter content of the carrot concentrate ranges between 40 and 75 wt % relative to the total of the concentrate,
wherein the wt. % (DM) means the wt. % of the component relative to the dry matter content,
wherein the ratio of edible oil to carotenoids ranges between 40 and 210,
and wherein the carrot concentrate has a color diluted in yoghurt, at dosage equivalent to a carotenoid concentration of 0.3795 mg/100 g (carotenoids measured following: SOP M939-modified SGS method of DIN EN 12823-2) (see internal SOP-GNTColor_hue_yoghurt),
wherein the color is defined in the CIELAB color space, and wherein the color is described by a L*-value ranging between 93 and 98, an a*-value ranging between −2.5 and +1.0, and a b*-value ranging between 21.5 and 30.

Preferably, the carrot concentrate is obtained from orange carrots.

Carrot concentrates related to this invention contain components of raw/fresh orange carrots, e.g. sugars, dietary fibers, sodium, proteins and fat. The main fatty acids of fresh orange carrots are linoleic acid, palmitic acid, linolenic acid, oleic acid and stearic acid. Sucrose is the most occurring natural sugar in orange carrots.

|  | Dietary fiber [% DM] | Sodium [% DM] | Ash [% DM] | Protein [% DM] | Fat from carrot [% DM] |
|---|---|---|---|---|---|
| Average | 6.78 | 0.21 | 4.10 | 7.54 | 4.96 |
| Std Dev. | 4.87 | 0.14 | 1.41 | 0.88 | 0.663 |

The carotenoid concentration of carrot concentrates is typically below 5 wt. % (calculated as β-carotene). The total carrot carotenoid content is usually composed of 20-45 wt % α-carotene and 55-80 wt. % β-carotene.

The carrot concentrate has a very intense yellow color due to the high concentration of carotenoids in the presence of the edible oil and the specific process to prepare the carrot concentrate. The color is stable, and only low amounts of color concentrate need to be added to color food products. The color of the carrot concentrate is sensitive to oxidation, therefore the presence of an antioxidant in the food application is preferred. The carrot concentrate is obtained from orange carrot.

Advantage of the color concentrate according to the invention is a high coloring capability to color foodstuff while applying low shear in the process to color foodstuff. The carrot concentrate can be applied in different ways to foodstuff, but excels in easy coloring of foodstuff. Preferably the coloring process of the foodstuff with the carrot concentrate can be performed under no shear, like for example with gentle mixing of the two components. The easily mixing and coloring process step preserves the natural structure of the foodstuff, which is important for the character and taste of the foodstuff.

Another advantage of the carrot concentrate according to the present invention is the absence of a strong impact of the taste of the foodstuff (no off flavor, or a neutral flavor): the carrot itself does not have a very strong taste, and due to the high color intensity, a low concentration of color concentrate can be added to the foodstuff. The yellow color carrot concentrate adds turbidity to certain applications (like soft drinks) and prevents the addition of cloudifier to the foodstuff.

Another important advantage is the fact that the carrot concentrate is seen as an ingredient, and not an additive color. Surprisingly the present yellow color concentrate is prepared from orange carrots, but has nevertheless a yellow color hue with a high color intensity.

The invention further relates to a process for making the carrot concentrate, wherein the process comprises the steps of:
a) Providing orange carrots;
b) Preparing an orange carrot juice from the orange carrots containing carotenoids;
c) Filtration of the orange carrot juice to obtain a retentate;
d) Determine the amount of carotenoids and oil in the retentate,
e) Adding an edible oil in an amount such that the total amount (weight) of edible oil is 40-210 times the amount of carotenoids, to obtain a mixture containing edible oil and carotenoids;
f) High shear mixing the mixture containing edible oil and carotenoids at a temperature between 106 and 140° C.
wherein the retentate has an amount of carotenoids of at least 0.25 wt. % (DM) and wherein the amount of edible oil in the carrot concentrate ranges between 7 and 24 wt. % relative to the total weight of the carrot concentrate.

Preferably the process also contains a step of concentrating the carotenoids, which can take place before or after the high shear mixing step f). The concentrating step can also take place between step b and c, or between step c and d.

The process of the invention has the advantage that a carrot concentrate can be obtained having an intense yellow color, which is stable and suitable as a natural ingredient for coloring food.

DETAILED DESCRIPTION OF THE INVENTION

The invention relates to a carrot concentrate having a high level of carotenoids and having an intense yellow color.

Carotenoids are also called tetraterpenoids, which are organic pigments that are produced by plants and algae, as well as several bacteria and fungi. In orange carrot, the carotenoids are mainly of the class of carotenes, which in this case are predominantly of the type of β-carotene (pro-vitamin A) and α-carotene. Preferably the total carotenoid content present in the carrot concentrate consist of 20-45 wt % α-carotene and 55-80 wt % β-carotene.

The carotenoids are present in a range between 0.115 and 0.25 wt. % relative to the total weight of the carrot concentrate. Preferably the amount of carotenoids ranges between 0.123 and 0.23 wt. %. The carrot concentrate according to the present invention has a carotenoid concentration of at least 0.115 wt. %, preferably at least 0.123 wt. % or 0.133 wt. %. In general the carotenoid concentration will be below 0.23 wt. %, or below 0.19 wt. %. Carotenoid concentration is measured according to SOP M939-modified SGS method of DIN EN 12823-2.

An edible oil is added to the (optionally concentrated) retentate in order to support the color shift from orange to yellow and stabilize the high concentration of carotenoid. Edible oil is already present to some extent in natural orange carrot, but needs to be added further in order to achieve a desired level of oil and desired color strength and color shade.

Edible oils are oils selected from the group consisting of almond oil, avocado oil, canola oil, coconut oil, corn oil, cottonseed oil, flaxseed oil, olive oil, palm oil, peanut oil, safflower oil, sesame oil, soybean oil, sunflower oil, walnut oil, rapeseed oil, beech nut oil, brazil nut oil, cashew oil, hazelnut oil, macadamia oil, mongongo nut oil, pecan oil, pine nut oil, pistachio oil, walnut oil, pumpkin seed oil, grapefruit seed oil, lemon oil, orange oil, citrus oils as well as MCT oils (medium chain triglycerides-oil).

These edible oils comprise esters of fatty acids and glycerol. Examples of fatty acids are linoleic acid, palmitic acid, linolenic acid, oleic acid, stearic acid, behenic acid, arachidic acid, caprylic acid, capric acid, lauric acid, myristic acid, palmitoleic acid.

Preferably sunflower oil is added as edible oil during the process of making the carrot concentrate according to the present invention.

The total amount of edible oil (defined as the sum of the edible oil present in the natural carrots and added edible oil) present in the carrot concentrate ranges between 40-210 times the amount (weight) of carotenoids present in the carrot concentrate.

Preferably the total amount of edible oil is between 7 and 24 wt. %, relative to the total weight of the carrot concentrate. In case the added oil is sunflower oil, the total amount of oil (naturally present and added sunflower oil) preferably ranges between 10 and 21 wt. %, more preferably between 12 and 20 wt. %.

The carrot concentrate contains sugar. The sugar is already present in orange carrots, but can also be added, for example as sugar syrup.

The sugar can contain monosaccharides, disaccharides, oligo saccharides and polysaccharides. Examples of monosaccharides are glucose, fructose and galactose. Examples of disaccharides are sucrose, which is a disaccharide of glucose and fructose, maltose and lactose.

The sugar content from glucose, fructose and sucrose ranges between 20 and 75 wt. % relative to the dry matter content (wt. % (DM)) of the carrot concentrate. Preferably the sugar content ranges between 20 and 55 wt. % (DM). More preferably the sugar content ranges between 25 and 53 wt. % (DM).

The amount of glucose typically ranges between 7 and 30 wt. % (DM), preferably between 7 and 23 wt. % (DM), more preferably between 10 and 18 wt. % (DM).

The amount of fructose typically ranges between 7 and 30 wt. % (DM), preferably between 7 and 23 wt. % (DM), more preferably between 10 and 18 wt. % (DM).

The amount of sucrose typically ranges between 7 and 30 wt. % (DM), preferably between 7 and 23 wt. % (DM), more preferably between 10 and 18 wt. % (DM).

The weight percentages of components like fructose, glucose and sucrose are determined relative to the total dry weight of the carrot concentrate (the dry matter basis). The dry weight of the carrot concentrate is determined by drying the carrot concentrate. The removal of water can be performed by heating the carrot concentrate, for example under vacuum at a temperature between 30 and 75° C., till no further weight loss occurs. When the dry matter of the carrot concentrate is 60 wt. %, the carrot concentrate will contain 40 wt. % of water.

The dry matter (DM) of the carrot concentrate ranges between 40 and 75 wt. %, preferably between 50 and 70 wt. %.

The dry matter content is determined according to ASU L 26.11.03-1a.

The carrot concentrate has an intense yellow color hue. The color hue can be determined by applying the CIELAB color space, recommended by CIE.

The color is measured diluted in yoghurt. First a mixture of the carrot concentrate and yoghurt is prepared according to SOP-GNTColor_hue_yoghurt, such that the carotenoid concentration in the yoghurt mixture is 0.3795 mg/100 g.

The color of the yoghurt mixture is described using the CIELAB color space, wherein the color is expressed as a L*-value, a*-value and b*-value.

Especially the a*-value determines the orange/red color hue of the concentrate. A large positive value of a* represents a red color, while a large negative value of a* represents green. An a* value between −2.5 and 1 in combination with a positive b*-value gives a yellow color, while a slightly positive a* value with a positive b*-value gives an orange color.

Preferably the a* and b* values in the CIELAB color space of the carrot concentrate are defined such that the a*-value ranges between −2.5 and +1, preferable between −2 and +0.5, more preferably between −1.5 and 0.

The b*-value ranges between 21.5 and 30, preferably between 23.5 and 29.5, more preferably between 25 and 29.

The L*-value ranges between 93 and 98.

Due to the process of the invention also a small particle size can be obtained.

Typically the d50 ranges between 0.3 and 4 μm (measured according to ISO1332:2009-12-01 (E), preferably between 0.6 and 3 μm or between 1 and 2.4 μm.

Additives

The carrot concentrate can contain additives like for example edible acids, fruit and/or vegetable concentrates, acidity regulators, stabilizers, antioxidants, preservatives, fibers, emulsifiers, flavoring agents (like terpenes and citrus oils), vitamines and proteines.

Specific examples of fruit/vegetable concentrates are pumpkin, pepper, turmeric, apple, grape, lemon and its deionized juices.

Specific examples of emulsifiers are gum arabic, quilaja extract, modified starch, proteins and phospholipids.

Specific examples of antioxidants are ascorbic acid, derivates of ascorbic acid (like for example sodium or potassium salt; fatty acid esters of ascorbic acid like ascorbyl palmitate), rosemary extract, tocopherols and tocopherol-rich extracts.

Specific examples of stabilizers are pectin, xanthan, carboxymethyl cellulose (CMC), carob bean gum, guar gum, sucrose acetate isobutyrate (SAIB), ester gum.

Specific examples of other acids are malic acid, tartaric acid and lactic acid.

Preferably citric acid is added as edible acid during the process of making the carrot concentrate according to the present invention.

Specific examples of preservatives are potassium sorbate, sodium benzoate, sulphites and the like.

Specific examples of acidity regulators are sodium, potassium, calcium and magnesium citrates or lactates.

Additives may be added according to Regulation 1333/2008 category 04.2.4.1 (permitted additives for fruit and vegetable preparations like coloring food products).

The amount of additives typically may range between 0 and 15 wt % relative to the carrot concentrate.

The viscosity of the carrot concentrate ranges between 250 and 1700 mPas, and is measured according to GNT internal SOP-GNTViscosity)

The carrot concentrate is stable concerning separation and has an instability index between 0 and 0.5, measured using the GNT internal SOP-GNTSeparation_stability.

The particle size of the carrot concentrate is measured according to GNT internal SOP-GNTParticle_size_distribution. The d50 (μm) ranges between 0.3 and 4 μm (volume distribution).

The carrot concentrate according to the present invention can replace several well-known color additives known in the art. Many of these compounds are classified as additives and fall under the commission regulation (EU) No. 231/2012. They may contain chemical additives to enhance taste or color, and therefore be not entirely natural and provide a potential health risk.

Process

The invention also relates to a process for making the carrot concentrate.

The process comprises the steps of:
a) Providing orange carrots;
b) Preparing an orange carrot juice from the orange carrots containing carotenoids;
c) Filtrating the orange carrot juice to obtain a retentate;
d) Determine the amount of carotenoids and oil in the retentate,
e) Adding an edible oil in an amount such that the total amount (weight) of edible oil is 40-210 times the amount of carotenoids, to obtain a mixture containing edible oil and carotenoids;
f) High shear mixing the mixture containing edible oil and carotenoids at a temperature between 106 and 140° C.

wherein the retentate has an amount of carotenoids of at least 0.25 wt. % (DM) and wherein the amount of edible oil in the carrot concentrate ranges between 7 and 24 wt. % relative to the total weight of the carrot concentrate.

Step a): The orange carrots can be provided in washed and/or peeled form.

Step b): the carrots are transformed into a carrot juice.

This is usually performed by the following steps:

b1) Mashing the orange carrots and mix the mashed carrots with water and acid to form a carrot mixture 1;

b2) Heating carrot mixture 1 to a temperature above 60° C. to obtain carrot mixture 2;

b3) Mashing carrot mixture 2 for a second time to obtain carrot mixture 3 b4) Separating carrot mixture 3 in a solid fraction 3 with an average particle size above 50 μm and a liquid 3;

b5) Treating liquid 3 with enzymes to prepare a mixture.

It is possible to use alternative ways to make a carrot juice out of orange carrots.

Step c): The filtration step is known to the man skilled in the art. Filtration can be for example ultrafiltration or microfiltration.

Step d): The amounts of carotenoids and oil are determined in accordance with SOP M939-modified SGS method of DIN EN 12823-2 (carotenoids) and according to ASU L 06.00-6 (determination of total fat)

Step e): The above carrot retentate can directly be enriched with edible oil. It is also possible to first (partly) concentrate the juice with for example an evaporation step, before adding the edible oil.

Therefore, the edible oil can be added before the filtration step, during the filtration step or after the filtration step. The edible oil should be present during the high mixing step at the defined elevated temperate.

The amount of edible oil needs to be in a certain ratio to the amount of carotenoid present. A too low ratio leads to a too low color extraction (and too low color intensity), while a too high ratio leads to a product which is instable and shows phase separation.

The weight ratio between edible oil and carotenoids ranges between 40 and 210, preferably between 50 and 150, more preferably between 60 and 120.

It is possible that the orange carrots already comprise a certain level of edible oil. The above ratio of edible oil to carotenoids includes both naturally occurring edible oils and added edible oils. A preferred edible oil to add is sunflower oil.

Step f): High shear mixing.

High shear mixing devices are known in the art. For example inline dispersers or ultra turrax mixing devices can be used. Other devices are homogenizers, colloid mill, ultrasonic devices, static mixers and cavitation devices.

The time for high shear mixing should be sufficient to dissolve the carotenoids into the oil. It typically ranges between a few seconds and more than an hour, for example between 30 seconds and 10 minutes, or between 1 minute to 5 minutes.

The high shear mixing is carried out at a temperature between 106 and 140° C., preferably between 110-135° C., more preferably between 118 and 132° C.

This high temperature in combination with the high shear mixing is critical for obtaining the yellow color. When only the high temperature is applied, but no high shear mixing, an orange color will be obtained. When high shear mixing is performed but outside the temperature range between 106 and 140° C., also an orange color will be obtained.

High shear mixing takes place after the addition of the oil, and also after the filtration step of the carrot juice.

The invention also relates to food products comprising the carrot concentrate according to the present invention. The food products are preferably prepared by gently mixing the carrot concentrate into the foodstuff.

EXAMPLES

General Procedure:

Several samples of a carrot concentrate were made with the following process:

Fresh carrots were mashed and mixed with water under the addition of citric acid solution (50 vol %) (sufficient to lower the pH to a value between 3 and 4.5). The mix was heated in two steps to 69 and 80° C., respectively. After heating the mash was shredded again and the solid fraction (>50 µm) was separated from the liquid phase (e.g. decanter, sieve). The liquid phase was cooled and optionally enzymatically treated (e.g. proteolytic and pectolytic enzymes). The treated liquid was ultra-filtered up to a carotenoid concentration of at least 0.25 wt. % (DM) and optionally concentrated up to 40 to 75° Brix.

Sunflower oil is added to the concentrated liquid phase in an amount such that the total amount of edible oil is 40-210 times the amount of carotenoids. The mixture containing carotenoids and edible oil is heated under high shear mixing to a temperature between 106 and 140° C. and held for an appropriate time until the color hue measured according to the SOP_GNTColor_hue_yoghurt method corresponds the specified range. The resulting carrot concentrate is then cooled to ambient temperature and stored chilled.

The properties of the pre-mix and final product are described in Table 1

Example 1

Orange carrot concentrate at 67% dry matter was mixed with sunflower oil and invert sugar (69° Brix) in the following ratio:

74% orange carrot concentrate
17.6% invert sugar
8.4% sunflower oil

The resulting pre-mix was high shear mixed with a high shear mixer (X50/10, Ystral GmbH, Ballrechten, Germany) for 10 min. The pre-mix was then heated to 125° C. in a tubular heat exchanger and held at this temperature for 2 min in a holding tube. After passing the holding tube, the mix was homogenized at 125° C. in a two stage homogenizer at 250/50 bar. After homogenization, the mix was cooled to 30° C. in a tubular heat exchanger.

A yellow carrot concentrate is obtained (see Table 3).

Example 2

Orange carrot concentrate at 65% dry matter was mixed with sunflower oil in the following ratio:

90.1% Orange carrot concentrate
9.9% Sunflower oil 1000 ppm ascorbic acid was added during pre-mixing.

The resulting pre-mix was high shear mixed with a high shear mixer (X50/10, Ystral GmbH, Ballrechten, Germany) for 10 min. The pre-mix was then heated to 130° C. in a tubular heat exchanger and held at this temperature for 1.5 min in a holding tube. After passing the holding tube, the mix was homogenized at 130° C. in a two stage homogenizer at 250/50 bar. After homogenization, the mix was cooled to 30° C. in a tubular heat exchanger.

A yellow carrot concentrate is obtained (see Table 3).

Example 3 Preparation of a Carrot Concentrate in a Batchprocess

Orange carrot concentrate at 67% dry matter was mixed with sunflower oil and invert sugar (69° Brix) in the following ratio:

68.3% orange carrot concentrate
23.2% invert sugar
8.5% sunflower oil

The resulting pre-mix was mixed in an open vessel under constant heating with a high shear mixer (X50/10, Ystral GmbH, Ballrechten, Germany). The mix was held under constant mixing at 106° C. for 30 min. After 30 min holding time the mix was cooled down to a temperature below 30° C.

A yellow carrot concentrate is obtained (see Table 3).

Example 4 Preparation of a Carrot Concentrate by Mixing a Low Brix Orange Carrot Concentrate Orange carrot concentrate at 65% DM was diluted with demineralized water to give a 20% DM concentrate. Sunflower oil and invert sugar (69° Brix) were added in the following ratio:

92.5% orange carrot concentrate (20% DM)
5.1% invert sugar
2.4% sunflower oil

The resulting pre-mix was mixed with a high shear mixer (X50/10, Ystral GmbH, Ballrechten, Germany) for 10 min. The pre-mix was then heated to 120° C. in a tubular heat exchanger and held at this temperature for 2.5 min in a holding tube. After passing the holding tube, the mix was homogenized at 120° C. in a two stage homogenizer at 230/46 bar. After homogenization, the mix was cooled to 25° C. in a tubular heat exchanger and subsequently evaporated under vacuum (30 mbar) to dry matter content of 69%.

A yellow carrot concentrate is obtained (see Table 3).

Comparative Experiment 5. Preparation of a Carrot Concentrate in the Absence of Additional Oil Orange carrot concentrate at 67% dry matter was mixed with invert sugar (69° Brix) in the following ratio:

68.3% orange carrot concentrate
31.7% invert sugar

The resulting pre-mix was high shear mixed (X50/10, Ystral GmbH, Ballrechten, Germany) for 10 min. The pre-mix was then heated to 125° C. in a tubular heat exchanger and held at this temperature for 5 min in a holding tube. After passing the holding tube, the mix was homogenized at 125° C. in a two stage homogenizer at 250/50 bar. After homogenization, the mix was cooled to below 30° C.

Processing a carrot concentrate in the absence of additional oil does not result in a yellow color but an orange color. (see Table 3)

Example 6 Preparation of a Carrot Concentrate by Mixing a Low Brix Orange Carrot Concentrate Orange carrot concentrate at 20% dry matter was mixed with sunflower oil in the following ratio:
96.4% Orange carrot concentrate
3.6% Sunflower oil The resulting pre-mix was high shear mixed with a high shear mixer (X50/10, Ystral GmbH, Ballrechten, Germany) for 10 min. The pre-mix was then heated to 130° C. in a tubular heat exchanger and held at this temperature for 1.5 min in a holding tube. After passing the holding tube, the mix was homogenized at 130° C. in a two stage homogenizer at 250/50 bar. After homogenization, the mix was cooled to 25° C. in a tubular heat exchanger and subsequently evaporated under vacuum (30 mbar) to dry matter content of 50%.

A yellow carrot concentrate is obtained (see table 3).

Comparative Experiment 7. Preparation of a Carrot Concentrate at Low Temperature Orange carrot concentrate at 68.1% dry matter was mixed with sunflower oil and invert sugar (69° Brix) in the following ratio:
68.4% orange carrot concentrate
23% invert sugar
8.6% sunflower oil The resulting pre-mix was high shear mixed with a high shear mixer (X50/10, Ystral GmbH, Ballrechten, Germany) for 10 min. The pre-mix was then heated to 95° C. in a tubular heat exchanger and held at this temperature for 2 min in a holding tube. After passing the holding tube, the mix was homogenized at 95° C. in a two stage homogenizer at 250/50 bar. After homogenization, the mix was cooled to 30° C. in a tubular heat exchanger.

Homogenization at a temperature below 106° C. results in an orange color instead of a yellow color.

Comparative Experiment 8. Preparation of a Carrot Concentrate without High Shear Mixing (According to Eur Food Res Technol (2015) 240:183-198; DOI 10.1007/s00217-014-2319-4)

Orange carrot concentrate at 67.3% dry matter was mixed with sunflower oil and invert sugar (69° Brix) in the following ratio:
74.9% orange carrot concentrate
16.7% invert sugar
8.4% sunflower oil The resulting pre-mix was filled into a 30 mL glass vial, closed tightly and heated up to 117° C. in 25 mi. The mix was held at 117° C. for 15 min. After 15 min holding time the mix was cooled down to a temperature below 50° C. Processing a carrot concentrate without high shear mixing at the temperature range between 106 and 140° C. does not result in a yellow color but an orange color. (see Table 3)

Comparative Experiment 9. Preparation of a Carrot Concentrate Using a High Pressure High Temperature (HPHT) Process (According to Eur Food Res Technol (2015) 240:183-198; DOI 10.1007/s00217-014-2319-4)

Orange carrot concentrate at 67.3% dry matter was mixed with sunflower oil and invert sugar (69° Brix) in the following ratio:
74.9% orange carrot concentrate
16.7% invert sugar
8.4% sunflower oil The resulting pre-mix was filled into 1.6 mL Nunc vials (Thermo Fischer Scientific, Waltham, USA) closed tightly and pressure was built up to 600 MPa combined with a process temperature of 117° C. in a high pressure vessel (U111, Unipress, Warsaw, Poland). The mix was held at 600 MPa and 117° C. for 10 min. After 10 min holding time the mix was immediately cooled down to a temperature below 100° C. due to pressure release and then further cooled down below 30° C. in ice water.

No shear has been applied in the high pressure high temperature process. This does not result in a yellow color, but rather an orange color is obtained.

Example 10

Orange carrot concentrate at 67.3% dry matter was mixed with sunflower oil and invert sugar (69° Brix) in the following ratio:
74.9% orange carrot concentrate
16.7% invert sugar
8.4% sunflower oil The resulting pre-mix was high shear mixed with a high shear mixer (X50/10, Ystral GmbH, Ballrechten, Germany) for 10 min. The pre-mix was then heated to 125° C. in a tubular heat exchanger and held at this temperature for 2 min in a holding tube. After passing the holding tube, the mix was homogenized at 125° C. in a two stage homogenizer at 250/50 bar. After homogenization, the mix was cooled to 30° C. in a tubular heat exchanger.

A yellow carrot concentrate is obtained (see Table 3).

TABLE 1 pre-mix composition

| Sample | Carotenoid content [wt %] | Dry matter | Oil content [wt %] | oil/ carotenoid ratio | Total sugar [wt %] |
|---|---|---|---|---|---|
| EX1 | 0.174 | 67.3 | 12.3 | 70.7 | 34.2 |
| EX2 | 0.196 | 65.2 | 15.7 | 80.1 | 21.4 |
| EX3 | 0.185 | 67.3 | 13.1 | 70.8 | 27.9 |
| EX4 | 0.049 | 20.3 | 3.5 | 71.4 | 9.1 |
| C Exp 5 | 0.175 | 67.4 | 3.9 | 22.3 | 26.1 |
| EX6 | 0.07 | 20.2 | 4.7 | 67.1 | 5.6 |
| C Exp 7 | 0.171 | 68.2 | 12.2 | 71.3 | 36.3 |
| C Exp 8 | 0.173 | 67.4 | 11.9 | 68.8 | 50.7 |
| C Exp 9 | 0.173 | 67.4 | 11.9 | 68.8 | 50.7 |
| EX 10 | 0.173 | 67.4 | 11.9 | 68.8 | 50.7 |

TABLE 2

(carrot concentrate composition)

| Sample | Carotenoid content [wt %] | Dry matter [wt %] | Oil content [wt %] | Oil/ carotenoid | Total sugar [wt %] |
|---|---|---|---|---|---|
| EX 1 | 0.115 | 67.5 | 12.4 | 107.8 | 34.3 |
| EX 2 | 0.135 | 65.4 | 15.8 | 117.0 | 21.5 |
| EX 3 | 0.122 | 70.6 | 13.7 | 112.3 | 29.3 |

TABLE 2-continued (carrot concentrate composition)

| Sample | Carotenoid content [wt %] | Dry matter [wt %] | Oil content [wt %] | Oil/ carotenoid | Total sugar [wt %] |
|---|---|---|---|---|---|
| EX 4 | 0.117 | 69 | 11.9 | 101.7 | 30.9 |
| C Exp 5 | 0.118 | 67.6 | 3.9 | 33.1 | 26.2 |
| EX 6 | 0.116 | 50.2 | 11.7 | 100.9 | 13.9 |
| C Exp 7 | 0.130 | 68.3 | 12.2 | 93.8 | 36.3 |
| C Exp 8 | 0.128 | 67.5 | 11.9 | 93.0 | 50.7 |
| C Exp 9 | 0.126 | 67.5 | 11.9 | 94.4 | 50.6 |
| EX 10 | 0.126 | 67.5 | 11.9 | 94.4 | 50.8 |

TABLE 3 color development.

| Sample | Separation stability [-] | Viscosity [mPa s] | d50 [μm] | L*(SOP GNTColor hue yoghurt) | a*(SOP GNTColor hue yoghurt) | b*(SOP GNTColor hue yoghurt) | Color |
|---|---|---|---|---|---|---|---|
| EX 1 | 0.22 | 625 | 1.9 | 94.5 | −1 | 27.0 | Yellow |
| EX 2 | 0.13 | 967 | 2.1 | 95 | −0.4 | 25.9 | Yellow |
| EX 3 | 0.03 | 1233 | 1.4 | 93.5 | −0.6 | 26.3 | Yellow |
| EX 4 | 0.29 | 601 | 1.8 | 97 | −0.7 | 26.9 | Yellow |
| C Exp 5 | 0.09 | 665 | 2.5 | 93.2 | 1.9 | 19.8 | Orange |
| EX 6 | 0.26 | 304 | 2.3 | 96 | −0.7 | 26.2 | Yellow |
| C Exp 7 | 0.21 | 1012 | 2.9 | 94.9 | 2.2 | 19.1 | Orange |
| C Exp 8 | 0.34 | 766 | 5.9 | 97 | 1.4 | 14.6 | Orange |
| C Exp 9 | 0.36 | 770 | 5.4 | 94.9 | 5.5 | 13.6 | Orange |
| EX 10 | 0.17 | 810 | 1.5 | 95.6 | −0.2 | 24.6 | Yellow |

Several parameters of various samples of the carrot concentrate were determined and the results are given in Table 1 for the pre-mix and table 2 for the final products. As comparative products the same properties were determined for Comparative Experiments 5, 7, 8 and 9. Comparative Experiments 8 and 9 give the wrong color hue and too large d50.

Determination of Carotenoids

SOP M939-modified SGS method of DIN EN 12823-2 (Foodstuffs—Determination of vitamin A by high performance liquid chromatography—Part 2: Measurement of β-carotene; German version EN 12823-2; 2000) with the following modifications;
  total carotenoids are determined photometrically in hexane
  for alpha- and beta-carotene determination, samples are at first cold saponificated using potassium hydroxide solution in methanol and extraction with hexane. Quantification is done using a HPLC-UV.

Determination of Fatty Acids

According to ISO 12966: Animal and vegetable fats and oils—Gas chromatography of fatty acid methyl esters—Part 2: Preparation of methyl esters of fatty acids (ISO 12966-2:2017); German version EN ISO 12966-2:2017 (with modifications)

Bound fatty acids are transferred to fatty acid methyl esters using potassium hydroxide solution in methanol or, depending on the fatty acid array, potassium hydroxide solution in methanol followed by boron trifluoride in methanol. The fatty acid methyl esters are determined using gas chromatography and are expressed as percentage distribution of mass.

Modifications comprise downscaling to reduce the amount of chemicals and replacement of equivalent chemicals (potassium hydroxide solution in methanol instead of sodium hydroxide solution in methanol). Modifications are accredited and reviewed regarding comparability to the original method.

Color Measurement (SOP-GNTColor_hue_Yoghurt)

Preparation: Yoghurt (Onken stichfest, 3.7% fat) is stirred until homogeneous.

YCC is mixed with yoghurt to give a carotenoid concentration of the mixture of 0,475 mg/100 g. The carrot concentrated is weighted in a beaker of 250 ml volume, the yoghurt is added. The mixture is gently agitated with a spoon until completely homogeneous and stored at ambient temperature for 30 minutes. During this time the mixture is gently mixed with a spoon every 5 minutes.

Spectrophotometric measurement of the mixture is done with a Lambda 2 (PerkinElmer, Massachusetts, USA) in reflectance mode. Baseline is performed with the yoghurt (Onken stichfest, 3.7%). For the measurement the yoghurt is filled in a VIS cuvette (Brand GmbH & Co. KG, Wertheim, Germany) with a path length of 10 mm. L*a*b* values are calculated with Optlab (Optlab, Ascanis). L*a*b* values express the color hue according to the CIE L*, a*, b* color space definition, wherein the L*-value ranges between 93 and 98, the a*-value ranges between −2.5 and +1.0, and the b*-value ranges between 21.5 and 30.

| Composition Yoghurt (Onken stichfest) | |
|---|---|
| | Amount [%] |
| Fat | 3.7 |
| saturated FS | 2.4 |
| Carbohydrates | 3.4 |
| Sugar | 3.4 |
| Protein | 3.7 |
| Salt | 0.15 |

Viscosity Measurement (SOP-GNTViscosity)

The viscosity of the carrot concentrate ranges between 250 and 1700 mPas, and is measured according to GNT internal SOP (SOP-GNTViscosity)

The viscosity of the carrot concentrates was monitored using an Anton Paar MCR 302 rheometer (Anton Paar Germany GmbH, Ostfildern, Germany) with a cylindrical geometry with a diameter of 27 mm. A 20 mL sample of carrot concentrate was transferred into the rheometer at 21° C. The viscosity was determined at a shear rate of 100 s$^{-1}$. The experiment was conducted for a total duration of 30 min and the viscosity was determined by calculating the mean of the last five minutes of the measurement.

Separation Stability (SOP-GNTSeparation_Stability).

The SOP used to measure the separation stability is in accordance with ISO/TR13097 standards, with slight modification. These are namely, that 1 mL product is tested without any dilution in test cuvettes with 2 mm diameter made of polycarbonate (Lum GmbH, Berlin, Germany). The stability test was done at 2325 g at a temperature of 21° C. in a photo centrifuge (Lumifuge; Lum GmbH, Berlin, Germany) with parallel NIR-light (870 nm) as illumination source. The progress of separation was measured every 10 s for in total 10.000 s. Particle migration was obtained space- and time resolved. The progress of separation describes the increase in transmission (decrease of particle concentration) and is quantified as clarification. Based on the evolution of transmission profile, kinetic data for the progress of separation were calculated from 119.5 mm to 129.5 mm of the measurement cuvette after 10.000 s measurement time. The instability index describes the clarification at a given time divided by the maximum clarification. The instability index is a dimensionless number and can be used to rank samples under the same experimental conditions at an appropriate time. The instability index was determined using the software SEPVIEW 6 (Lum GmbH, Berlin, Germany). In this invention the instability index ranges between 0 and 0.5 where 0 means the product is very stable and no changes of particle concentration occur and 0.5 indicates the sample is less stable and changes in transmission occur.

Particle Size Distribution (SOP GNT-Particle_Size_Distribution)

The SOP to determine the particle size distribution is in accordance with ISO 13320:2009-12-01(E). The carrot concentrate was measured using static light scattering (Mastersizer 3000 with Hydro MV; Malvern Instruments, Malvern, UK). Measurements are done at ambient temperature. The carrot concentrate was diluted with the aqueous dispersion medium prior to analysis to avoid multiple scattering effects. The obscuration was between 4 to 10%. Stirrer speed was adjusted to 2000 rpm. No sonification was applied. The refractive index of the aqueous dispersion medium and of the carrot concentrate phase were 1.33 and 1.47. The particle absorption index was 1.0. Particles are regarded as non-globular. The Mie model was applied to calculate the size of the particles. The particle diameter of each sample corresponds to 50% of the cumulative undersize distribution by volume (median particle diameter). The calculation of the median particle diameter was done using the Mastersizer Software Version 3.30. The D50 (µm) ranges between 0.3 and 4 µm (volume distribution).

In Table A the parameters are defined as listed here below:

| Parameter | Method | Description/Modification |
|---|---|---|
| D-Glucose | ASU L 31.00-12 (1997-01) | Equal to DIN EN 1140 - spectrophotometrically determination of NADPH "Fruit and vegetable juices - Enzymatic determination of D-glucose and D-fructose content - NADPH spectrometric method; German version EN 1140: 1994" |
| D-Fructose | ASU L 31.00-12 (1997-01) | Equal to DIN EN 1140 - spectrophotometrically determination of NADPH "Fruit and vegetable juices - Enzymatic determination of D-glucose and D-fructose content - NADPH spectrometric method; German version EN 1140: 1994" |
| Sucrose | ASU L 31.00-13 (1997-09) | Equal to DIN EN 12146 - spectrophotometrically determination of NADPH "Fruit and vegetable juices - Enzymatic determination of sucrose content - NADP spectrometric method; German version EN 12146: 1996" |
| Fat/edible oil | ASU L 06.00-6 (2014-08) | Determination of total fat content in meat and meat products. |
| Dry matter | ASU L 26.11.03-1a (1983-05) | Vacuum at 70° C. |
| Ash | ASU L 31.00-4 (1997-01) | Gravimetric determination of ash in fruit and vegetable juices Ashing temperature: 525° C. |

What is claimed is:

1. A carrot concentrate, comprising;
  a. between 0.115 and 0.25 wt. % carotenoid (relative to the total weight of the carrot concentrate);
  b. between 7-24 wt. % edible oil (relative to the total weight of the carrot concentrate);
  c. between 20 and 75 wt. % (DM) of sugars (relative to the dry matter of the carrot concentrate);
  wherein the dry matter content of the carrot concentrate ranges between 40 and 75 wt. % relative to the total of the concentrate,
  wherein the wt. % (DM) means the wt. % of the component relative to the dry matter content,
  wherein the ratio of edible oil to carotenoids ranges between 40 and 210,
  and wherein the carrot concentrate has a color diluted in yoghurt, at dosage equivalent to a carotenoid concentration of 0.3795 mg/100 g as measured according to the following procedure: SOP M939—modified SGS method of DIN EN 12823-2, wherein the color is defined in the CIELAB color space, and wherein the color is described by a L*-value ranging between 93 and 98, an a*-value ranging between −2.5 and +1.0, and a b*-value ranging between 21.5 and 30.

2. The carrot concentrate according to claim 1, wherein the amount of carotenoids ranges between 0.123 and 0.23 wt. %.

3. The carrot concentrate according to claim 2, wherein the amount of sugars range between 20 and 55 wt. % (DM), and wherein the total carotenoid content present in the carrot concentrate consists of 20-45 wt. % α-carotene and 55-80 wt. % β-carotene.

4. The carrot concentrate according to claim 3, wherein the edible oils are selected from the group consisting of almond oil, avocado oil, canola oil, coconut oil, corn oil, cottonseed oil, flaxseed oil, olive oil, palm oil, peanut oil, safflower oil, sesame oil, soybean oil, sunflower oil, walnut oil, rapeseed oil, beech nut oil, brazil nut oil, cashew oil, hazelnut oil, macadamia oil, mongongo nut oil, pecan oil, pine nut oil, pistachio oil, walnut oil, pumpkin seed oil, grapefruit seed oil, lemon oil, orange oil, citrus oils as well as MCT oils (medium chain triglycerides-oil), and wherein the sugar contains glucose, fructose and sucrose and the sugar content ranges between 25 and 53 wt. % relative to the dry matter content (wt. % (DM)) of the carrot concentrate.

5. The carrot concentrate according to claim 4, wherein the sugar contains glucose, fructose and sucrose and wherein the amount of glucose ranges between 7 and 30 wt. % (DM), the amount of fructose ranges between 7 and 30 wt. % (DM), and the amount of sucrose ranges between 7 and 30 wt. % (DM), and wherein a*-value ranges between −2.0 and +0.5, the b*-value ranges between 23.5 and 29.5.

6. The carrot concentrate according to claim 5, wherein weight ratio between edible oil and carotenoids ranges between 50 and 150, and wherein the carrot concentrate has particles having a d50 ranging between 0.3 and 4 μm (measured according to ISO1332:2009-12-01 (E).

7. Food products comprising the carrot concentrate according to claim 6.

8. The carrot concentrate according to claim 1, wherein the amount of sugars range between 20 and 55 wt. % (DM).

9. The carrot concentrate according to claim 1, wherein the total carotenoid content present in the carrot concentrate consists of 20-45 wt % α-carotene and 55-80 wt % β-carotene.

10. The carrot concentrate according to claim 1, wherein the edible oils are selected from the group consisting of almond oil, avocado oil, canola oil, coconut oil, corn oil, cottonseed oil, flaxseed oil, olive oil, palm oil, peanut oil, safflower oil, sesame oil, soybean oil, sunflower oil, walnut oil, rapeseed oil, beech nut oil, brazil nut oil, cashew oil, hazelnut oil, macadamia oil, mongongo nut oil, pecan oil, pine nut oil, pistachio oil, walnut oil, pumpkin seed oil, grapefruit seed oil, lemon oil, orange oil, citrus oils as well as MCT oils (medium chain triglycerides-oil).

11. The carrot concentrate according to claim 1, wherein the sugar contains glucose, fructose and sucrose and the sugar content ranges between 25 and 53 wt % relative to the dry matter content (wt. % (DM)) of the carrot concentrate.

12. The carrot concentrate according to claim 1, wherein the sugar contains glucose, fructose and sucrose and wherein the amount of glucose ranges between 7 and 30 wt. % (DM), the amount of fructose ranges between 7 and 30 wt. % (DM), and the amount of sucrose ranges between 7 and 30 wt. % (DM).

13. The carrot concentrate according to claim 1, wherein a*-value ranges between −2.0 and +0.5, the b*-value ranges between 23.5 and 29.5.

14. The carrot concentrate according to claim 1, wherein weight ratio between edible oil and carotenoids ranges between 50 and 150.

15. The carrot concentrate according to claim 1, wherein the concentrate has particles having a d50 ranging between 0.3 and 4 μm (measured according to ISO1332:2009-12-01 (E).

16. Food products comprising the carrot concentrate according to claim 1.

17. The carrot concentrate according to claim 1, wherein a*-value ranges between −1.5 and 0, the b*-value ranges between 25 and 29.

18. The carrot concentrate according to claim 1, wherein weight ratio between edible oil and carotenoids ranges between 60 and 120.

19. A process for making the carrot concentrate according to claim 1, wherein the process comprises the steps of:
  a. Providing orange carrots;
  b. Preparing an orange carrot juice from the orange carrots containing carotenoids;
  c. Filtrating the orange carrot juice to obtain a retentate;
  d. Determine the amount of carotenoids and oil in the retentate;
  e. Adding an edible oil in an amount such that the total amount (weight) of edible oil is 40-210 times the amount of carotenoids, to obtain a mixture containing edible oil and carotenoids;
  f. High shear mixing the mixture containing edible oil and carotenoids at a temperature between 106 and 140° C., wherein the retentate has an amount of carotenoids of at least 0.25 wt. % (DM) and wherein the amount of edible oil in the carrot concentrate ranges between 7 and 24 wt. % relative to the total weight of the carrot concentrate.

20. The process according to claim 19, wherein sunflower oil is added as edible oil during the process of making the carrot concentrate.

21. The process according to claim 20, wherein the total amount of oils (naturally present and added sunflower oil) preferably ranges between 10 and 21 wt %.

22. A process for making the carrot concentrate according to claim 6, wherein the process comprises the steps of:
  a. Providing orange carrots;
  b. Preparing an orange carrot juice from the orange carrots containing carotenoids;
  c. Filtrating the orange carrot juice to obtain a retentate;
  d. Determine the amount of carotenoids and oil in the retentate;
  e. Adding an edible oil in an amount such that the total amount (weight) of edible oil is 40-210 times the amount of carotenoids, to obtain a mixture containing edible oil and carotenoids;
  f. High shear mixing the mixture containing edible oil and carotenoids at a temperature between 106 and 140° C., wherein the retentate has an amount of carotenoids of at least 0.25 wt. % (DM) and wherein the amount of edible oil in the carrot concentrate ranges between 7 and 24 wt. % relative to the total weight of the carrot concentrate.

* * * * *